United States Patent [19]
Leimer et al.
[11] Patent Number: 4,486,543
[45] Date of Patent: Dec. 4, 1984

[54] POLYCRYSTALLINE SHAPED BODY OF SILICON CARBIDE AND METHOD FOR ITS PRODUCTION

[75] Inventors: Gerhard Leimer; Ernst Gugel, both of Bavarian, Fed. Rep. of Germany

[73] Assignee: Feldmühle Aktiengesellschaft, Dusseldorf, Feb. Rep. of Germany

[21] Appl. No.: 324,323

[22] Filed: Nov. 23, 1981

[30] Foreign Application Priority Data

Nov. 24, 1980 [DE] Fed. Rep. of Germany ....... 3044162

[51] Int. Cl.³ .............................................. C04B 35/56
[52] U.S. Cl. ...................................................... 501/88
[58] Field of Search .......................................... 501/88

[56] References Cited

U.S. PATENT DOCUMENTS

| | | | |
|---|---|---|---|
| 4,004,934 | 1/1977 | Prochazka | 501/90 |
| 4,097,293 | 6/1978 | Komeya et al. | 501/88 |
| 4,124,667 | 11/1978 | Coppola et al. | 501/90 |

FOREIGN PATENT DOCUMENTS

| | | | |
|---|---|---|---|
| EP28802 | 5/1981 | European Pat. Off. | 501/88 |
| 54-3114 | 1/1979 | Japan | 501/88 |
| 55-97442 | 7/1980 | Japan | 501/88 |
| 56-92168 | 7/1981 | Japan | 501/88 |
| 56-92169 | 7/1981 | Japan | 501/88 |

*Primary Examiner*—Mark Bell
*Attorney, Agent, or Firm*—Toren, McGeady and Stanger

[57] ABSTRACT

Polycrystalline shaped body of a density of at least 98% of the theoretical density of silicon carbide, consisting of at least 92 weight % of $\alpha$-silicon carbide and/or $\beta$-silicon carbide, which is present in the form of a homogeneous texture with grains of maximal 10 $\mu$m, and is characterized by the fact that, besides a content of up to 3 weight % of boron, a share of about 0.5 to 5 weight % of a metal or rare earth element that acts reducing or mixtures thereof is present, and the body shows a transverse rupture strength (determined by the four-point method) of at least 500 N/mm$^2$ up to 1,400 C and is essentially free of free carbon.

A method for the production of shaped bodies through the pressureless sintering of the silicon carbide starting material, characterized by the fact that about 0.5 to 5% of metals or rare earth elements are added individually or as mixtures to the starting material, that the resulting starting material mixture is shaped, and the shaped body pressureless sintered at temperatures from 1,900° to 2,200° C. under vacuum or in a protective gas atmosphere.

4 Claims, No Drawings

POLYCRYSTALLINE SHAPED BODY OF SILICON CARBIDE AND METHOD FOR ITS PRODUCTION

The invention consists of a polycrystalline shaped body of silicon carbide with a density of at least 98% of the theoretical density of silicon carbide and of a method for the production of such shaped bodies.

Polycrystalline shaped bodies of silicon carbide are characterized by many valuable properties like oxidation resistance, thermal shock resistance, favorable creep behavior, relatively low density, low thermal expansion and high thermal conductivity, and high hardness. Because of these properties silicon carbide offers great advantages for applications as high temperature machine components.

Comparatively high strength values of up to 600 $N/mm^2$ and more can be achieved with hot pressed silicon carbide which compositionally consists practically only of silicon carbide with minor amounts of aluminum compounds, boron compounds, and iron compounds. However, this process is expensive and therefore not used for economic reasons. Besides, the method is suitable only for relatively simple shapes.

More complicated shapes can be achieved through pressureless sintering of silicon carbide.

A pressureless sintered silicon carbide is described in DE-OS No. 24 49 662. The essential feature of that theory is the use of an extremely fine-grained silicon carbide powder in order to obtain a surface of disturbed electron neutrality and therefore high sintering activity, i.e., to employ powders that permit atomic mobility. One starts with the $\beta$-modification of silicon carbide because it can be fabricated in ways that result in extremely fine-grained silicon carbide and no additional fragmenting is required. An essential part of the production method is the adjustment of the ratio of grain boundary energy to surface energy through additions of boron and carbon to a ratio that is favorable for sintering under shrinkage. Boron dissolves moderately in silicon carbide and decreases therefore the grain boundary energy. Carbon increases the surface energy because it frees the silicon carbide from the always present $SiO_2$ skin.

DE-OS No. 26 24 641 describes that the $\alpha$-modification of silicon carbide can be sintered pressureless too when the silicon carbide has been prepared sufficiently fine. Boron and carbon serve again as sintering additives. An important advantage of being able to use the $\alpha$-modification of silicon carbide is the fact that no phase transformation occurs when certain sintering temperatures are exceeded, as is the case with the $\beta$-modification of silicon carbide. The phase transformation of the $\beta$-modification of silicon carbide is accompanied by growth of very large grains, which prevents further densification or, if the material is dense already, leads to poor strength. The range in sintering temperature for an optimal densification of the $\beta$-modification of silicon carbide is relatively narrow and can therefore in large furnace installations be controlled only with considerable effort.

A dense polycrystalline shaped body of $\alpha$-silicon carbide and a method for its production through pressureless sintering are described in the European patent application No. 0004031. $\alpha$-silicon carbide in the form of a submicron powder is cold pressed and shaped under addition of small amounts of an aluminum compound other than an oxide and a carbon containing additive like carbon black, phenolic formaldehyde condensation products, or coal tar pitch and subsequently sintered pressureless at temperatures from 2,000 C. to 2,300 C. This is based on experiments which showed that excessive grain growth occurs in the pressureless method too at high sintering temperatures when the starting material is $\alpha$-silicon carbide with boron and carbon containing additives and that an inhomogeneous microtexture results in the finished sintered bodies. The sintered bodies obtained in that way are of about 96% TD (theoretical density), but specimens sintered at temperatures from 2,100 C. are largely recrystallized and the hot transverse rupture strength is below 300 $N/mm^2$. Only the specimens sintered at 2,050 C. are of homogeneous fine-grained microtexture with an average grain size of 5 $\mu$m.

The conclusion is that the pressureless sintering of silicon carbide with boron containing additives is difficult to achieve if sintered bodies of high density as well as uniformly fine-grained microtexture are to be produced.

According to European patent application No. 0004031, aluminum and carbon are used as additives in order to make polycrystalline shaped bodies of silicon carbide that can be produced in a simple way and are of improved properties, especially high temperature strength. The aluminum and the nitrogen and carbon, if present, are essentially contained in the silicon carbide lattice in the form of a solid solution such that they can, for example, not be identified as separate phases at magnifications up to 2,400 X.

With these additives one can achieve transverse rupture strengths of the sintered bodies of at least 500 $N/mm^2$ at room temperature and the strengths are retained for temperature increases up to 1,600 C. The transverse rupture strength was, however, determined by the three-point method which yields higher results than todays four-point method.

In particular, polycrystalline shaped bodies fabricated by this method, obviously the most advanced one, show comparatively large scatter, i.e., the finished shaped bodies show large deviations in individual strength.

The purpose of the present invention is to provide a polycrystalline shaped body of silicon carbide that is procured by pressureless sintering, yet shows strength values of an order of magnitude comparable to that of shaped bodies of hot pressed silicon carbide, and can be produced with comparatively low scatter.

The polycrystalline shaped body is of a density of at least 98% of the theoretical density of silicon carbide and consists of at least 92 weight % of $\alpha$-silicon carbide and/or $\beta$-silicon carbide, which is present in the form of a homogeneous texture with grain sizes of maximal 10 $\mu$m, and contains, besides 0.3 to 3 weight % of boron, a share of about 0.5 to 5.0 weight % of a metal or rare earth metal which act reducing, or mixtures thereof. The shaped silicon carbide body has a transverse rupture strength (determined by the four-point method) of at least 500 $N/mm^2$ up to 1,400 C. and is essentially free of free carbon.

The method of this invention for the production of such a shaped body through the pressureless sintering of the starting material is characterized by the fact that 0.5 to 5% of metals or rare earth metals are added individually or as mixtures to the silicon carbide starting powder and act reducing, that the resulting starting powder mixture is shaped, and that the shaped body is pressureless sintered at temperatures from 1,900 C. to 2,220 C. under vacuum or a protective gas atmosphere. If desired, the shaped body can be subjected to a hot, isostatic aftertreatment.

A further improvement of the invention can be achieved when especially fine and ultra-pure silicon carbide is used as starting material.

It is, for example, advantageous to use as silicon carbide powder a powder with a specific surface area between 10 and 20 $m^2/g$ in which at least 95% of the grains are below 1 $\mu m$ in size and which is free of impurities that reduce to metals and are liquid at the sintering temperature.

The method assures that values can be achieved that are comparable to those achieved with hot pressed silicon carbide shaped bodies.

The attached table lists four different silicon carbide shaped bodies. Shaped body I was fabricated using current technology, shaped body II was produced by the method of this invention, shaped body III was produced by the method of this invention using a specially selected fine-grained silicon carbide, and shaped body IV was prepared similar to III, except for the use of specially pure silicon carbide. One sees clearly the improvements possible in the critical parameters of the shaped body through this invention.

| | Additive | Treatment | Bulk Density | MOR max. | MOR av. | Weibull Modulus m |
|---|---|---|---|---|---|---|
| I | 2,5 C<br>0,5 B | — | 3,15 | 350 | 300 | 5 |
| II | 2,5 Zr<br>0,5 B | — | 3,18 | 550 | 450 | 5 |
| III | 2,5 Zr<br>0,5 B | Air Sifted | 3,17 | 570 | 510 | 8 |
| IV | 2,5 Zr<br>0,5 B | Air Sifted and ultra-pure SiC | 3,18 | 580 | 550 | 12 |

We claim:

1. A polycrystalline body having a shape sufficiently complicated such that it cannot be produced by hot pressing and having a theoretical density of at least 98% of the theoretical density of silicon carbide, consisting of at least 92 weight percent of $\alpha$-silicon carbide, $\beta$-silicon carbide, or mixtures thereof which is present in the form of a homogeneous texture with grains of maximal 10 $\mu m$, up to 3 weight percent of boron, a share of about 0.5 to 5 weight percent of a reducing agent selected from the group consisting of titanium, zirconium, hafnium, scandium, yttrium, lanthanum, and cerium, and mixtures thereof, and which exhibits a transverse rupture strength, determined by the four-point method, of at least 500 $N/mm^2$ up to 1,400 C., is essentially free of free carbon and prepared by pressureless sintering.

2. A method for the production of shaped bodies according to claim 1 through the pressureless sintering of the silicon carbide starting material, characterized by the fact that about 0.5 to 5% of metals or rare earth elements are added individually or as mixtures to the starting material, that the resulting starting material mixture is shaped, and the shaped body pressureless sintered at temperatures from 1,900 to 2,200 C. under vacuum or in a protective gas atmosphere.

3. A method according to claim 2, characterized by the fact that the silicon carbide powder used is a powder with a specific surface area between 10 and 20 $m^2/g$ in which at least 95% of the grains are below 1 $\mu m$ in size and which is free of impurities that reduce to metals and are liquid at the sintering temperature.

4. A method according to claim 2 or 3, characterized by the fact that the shaped body is subjected to a hot isostatic aftertreatment.

* * * * *